Patented July 6, 1954

2,683,150

UNITED STATES PATENT OFFICE 2,683,150

RECOVERY OF GLUCURONIC ACID DERIVATIVES BY ESTERIFICATION PROCEDURES

Alexander L. Wilson, Palos Park, and Arthur M. Mark, Chicago, Ill., assignors to Corn Products Refining Company, New York, N. Y., a corporation of New Jersey No Drawing. Application February 11, 1950, Serial No. 143,827

17 Claims. (Cl. 260—343.5)

This invention relates to a process for the isolation or concentration of uronic acids or uronolactones from mixtures, and more particularly from oxidation mixtures, containing the same.

Uronic acids are generally prepared by preferential oxidation of the primary alcohol group of an aldose in which the aldehyde function has been protected by appropriate derivatization and in which the primary alcohol group is free. For example, glucuronic acid is obtained by oxidation of glucose derivatives such as the lower alkyl glucosides. Various oxidants and methods of oxidation have been utilized in attempts to achieve preferential oxidation of the primary alcohol group of aldoses. However, none of these methods have proved completely selective inasmuch as a substantial degree of undesirable types of oxidation occurs along with the desired preferential oxidation of the primary alcohol group.

Some oxidation apparently takes place at the first or aldehydic carbon atom of the aldose, possibly due to some hydrolytic splitting off of the protective grouping. The secondary alcohol groups of the sugar are also subject to oxidative attack, which may ultimately result in rupture of the carbon to carbon bonds of the aldose chain and give rise to acids of fewer carbon atoms than the original aldose. Thus, in oxidation of glucosides, in addition to the terminal or primary alcohol group it is desired to selectively oxidize, some degree of oxidation may occur at the aldehyde group, despite its derivatization, and there are four secondary alcohol groups which may be attacked. This already makes possible a considerable number of oxidation products, but when the further fact is considered that oxidative degradation of the carbon chain of both the original aldose and the oxidation products themselves may occur to a variable degree, it may be readily understood that an extremely large number of oxidation products is possible, resulting in an exceedingly complex reaction mixture.

Furthermore, there is evidence that at the early stages of the reaction undesirable side reactions are competitive with the desired selective oxidation, and that at later stages of the reaction oxidation of the uronic acid derivative itself may occur, since apparent uronic acid values reach a maximum and subsequently decrease during most methods of oxidation. The complexity of the reaction mixture obtained may vary considerably depending upon the particular oxidant employed and the degree to which its oxidative action is selective.

A typical mixture obtained in the oxidation of a lower alkyl glucoside such as methyl glucoside may contain approximately 20 to 40% or a somewhat higher percentage of alkyl glucuronoside, the balance of the material being various other oxidation products and also some unreacted glucoside, since it is generally more practical to determine the oxidation at least when, and preferably somewhat before, maximum conversion to glucuronoside has been attained to economize on time and reagents, to avoid as far as possible destruction of the glucuronic acid derivative formed, and to avoid increasing the complexity of the reaction mixture.

The great complexity of typical oxidation mixtures, even when oxidations are carried out under the most favorable conditions, has made it extremely difficult, laborious, and sometimes even impossible, to isolate the pure glucuronic acid derivative, free glucuronic acid, or glucuronolactone.

Accordingly it is an object of this invention to provide a process for obtaining substantially pure glucuronic acid, glucuronolactone, or derivatives thereof from oxidation mixtures containing the same. It is a further object of this invention to provide a process for obtaining crystalline glucuronolactone from an oxidation mixture containing the same. Another object is to obtain free glucuronic acid or crystalline glucuronolactone from mixtures resulting from the oxidation of glucose derivatives such as the lower alkyl glucosides, particularly methyl glucoside. Still another object is to provide a process for obtaining glucuronolactone, glucuronic acid, or derivatives thereof, in good yield and in a substantially pure state. Other objects and advantages will appear hereinafter.

In general, the present invention comprises esterifying a crude mixture from oxidation of a glucose derivative to the corresponding glucuronic acid derivative; separating the esterified glucuronic acid derivative from water-soluble and also, if desired, from tar and color body components of the mixture; and recovering substantially pure glucuronolactone, glucuronic acid, or derivatives thereof.

In carrying out the process of the present invention the crude mixture from any oxidation process adapted to the production of glucuronic acid from a glucose derivative in which the aldehyde group is protected and the primary alcohol group is free may be used. The mixture to be esterified is preferably freed of any excess oxidant and solvent, particularly water as the latter interferes with esterification, especially if present in large amount. However, removal of water may be accomplished conjointly with the esterification process as will be described below. If desired, some preliminary partial refining of the mixture may precede the process of this invention, such as conversion of acidic materials present to sodium or barium salts or salts of other metals. Mixtures from oxidation by means of acidic reagents such as nitrogen dioxide are suitable for use after removal of excess oxidizing agent and any reaction solvent employed, while mixtures from oxidations carried out in the presence of bases or inorganic salts may be employed without removal of such materials since they will be separated during the esterification. However, such mixtures may also be treated for removal of such materials prior to esterification.

The alcohols used as esterifying agents in the process of this invention should be such that the glucuronic acid components of the oxidation mixture may be esterified at a rate exceeding the rate of destruction of the glucuronic acid values; the alcohol or its water-saturated solution should be a good solvent for the glucuronic ester; and the glucuronic ester formed should be readily extractable from water, i. e., insoluble in water or at least more soluble in organic solvents than it is in water. Generally speaking, alcohols containing from 2 to 7 carbon atoms in the molecule are suitable, although alcohols of more or less carbon atoms may also be used, depending upon the particular glucuronic acid derivative being esterified. The preferred alcohols are those containing 3 to 5 carbon atoms, i. e., propyl, butyl, and amyl alcohols. In general, the alcohols containing primary hydroxyl groups permit of more rapid esterification than do secondary or tertiary alcohols. Commercial grades of alcohols and commercial mixtures such as the mixture of amyl alcohols sold as "Pentasol" solvent are satisfactory.

The exact amount of alcohol to be used is not critical except that at least sufficient amount should be used to allow substantially complete esterification of organic acids present in the oxidation mixture. However, it is desirable to employ a substantial excess of alcohol over the theoretical amount, not only to aid in securing complete and rapid esterification, but also because oxidation mixtures of the type referred to are soluble in an excess of the alcohols suitable for esterification or rapidly become so upon heating. Furthermore, an excess of alcohol is desirable since it also serves as a solvent for the esterified products during subsequent treament according to the present invention. In addition, an excess of the alcohol during esterification is convenient for azeotropic removal of water, as will be described below.

To secure efficient esterification the reaction is preferably carried out in the presence of an acidic esterification catalyst, for example, sulfuric, phosphoric, hydrochloric or benzenesulfonic acids. If there is any base in the oxidation mixture, sufficient acid must be added to neutralize such base and also provide an excess in a catalytic amount. The acid may be added until an effective pH value within the range of approximately 1 to 2 is obtained, or the amount of acid necessary to neutralize the base together with a catalytic excess may be added. Satisfactory results are obtained when the acid present, in excess of acid required for neutralization, amounts to about 0.5 to about 5.0% by weight of the mixture.

The simplest means of securing esterification is to heat the oxidation mixture, alcohol and catalyst to boiling under atmospheric pressure, although any convenient means of achieving the esterification may be utilized. Rapid and substantially complete esterification of esterifiable components of the oxidation mixture may be insured by continuous removal of water by azeotropic distillation with the alcohol. If the esterifying alcohol employed is immiscible with water, the latter can readily be separated from the distillate by mechanical means and the alcohol returned to the process. With lower alcohols which are miscible with water, a large part of the water formed during the reaction and residual moisture in the oxidation mixture may be distilled off with the alcohol also, although with these alcohols separation of the alcohol and water is more difficult.

The reaction is allowed to proceed until esterification is essentially complete or equilibrium is attained. When water-immiscible alcohols are used, continuous azeotropic removal of water, as described above, provides a convenient means of following the course of the reaction, since water is a product of esterification and in this case the water separates from the alcohol, and the reaction may be considered essentially complete when it is observed that no further quantities of water are distilling over.

Upon termination of the esterification reaction, any inorganic salts, tars, or unreacted material insoluble in the alcohol are removed from the mixture prior to further processing.

The cooled esterification mixture is extracted with water, thereby removing water-soluble impurities. If the esterifying alcohol is miscible with water, a sufficient quantity of water-immiscible alcohol or a less polar solvent such as a hydrocarbon, e. g., benzene, must be added to the alcoholic ester solution so that the esters will be dissolved in a water-immiscible solvent. If the esterifying alcohol is itself water-immiscible, the solution of esterification mixture in the excess of alcohol may be used directly in this extraction step or hydrocarbon solvent may also be added, since in some cases additional quantities of impurities may be forced into the aqueous phase by such addition. Maximum refining effect at this stage is secured if multiple or countercurrent extraction procedures are employed. If the time consumed in this aqueous extraction step is to be prolonged, it is of advantage to neutralize the excess inorganic acid present in the esterification mixture prior to this step, so as to avoid hydrolysis of the esters.

Further purification of the enriched uronic acid ester solution may be achieved in some cases by massive hydrocarbon addition, which results in a separation of tars and color bodies.

The alcoholic phase, thus enriched with respect to uronic acid values may now be processed to obtain free uronic acid or crystalline products. If the free uronic acid or uronolactone is desired, both the ester groups and the aldehyde protective groups may be removed by hydrolysis. Hydrolysis in the presence of an acid, e. g., dilute sulfuric or hydrochloric acid, may be used to accomplish simultaneous hydrolysis of both types of groupings. If it is desired to remove only the ester group, mild alkaline hydrolysis appears preferable.

If acid hydrolysis is employed, appreciable amounts of color, tars and any unhydrolyzed ester may be removed by extracting the hydrolyzate with a water-immiscible alcohol, e. g. butyl alcohol, thereby increasing the yield and purity of the products.

Various methods of recovering either the free uronic acid or crystalline uronolactone are suitable and will readily suggest themselves to those skilled in the art. One such process comprises the removal of the major portion of the water present in the hydrolyzate by concentration under vacuum, dilution of the concentrated hydrolyzate with glacial acetic acid, and allowing uronolactone to crystallize. However, various other means of water removal, other media for crystallization, and variations depending upon whether uronic acid or uronolactone is the desired product may be employed.

The following examples which are intended as informative and typical only and not in a limiting sense will further illustrate the invention. Analyses for glucuronic acid were made by the naphthoresorcinol method.

EXAMPLE I

I. Oxidation and preliminary purification 1000 grams of crystalline methyl-alpha-D-glucoside was agitated with 6700 grams of carbon tetrachloride and 600 grams of nitrogen dioxide for 24 hours at 25° C. to oxidize the glucoside to the methyl glucuronoside At the end of this time the oxidation mixture was aerated to remove excess nitrogen oxides and the oxidation product separated as a light phase from the carbon tetrachloride. 830 grams of water was added to the separated product and aeration repeated. 660 grams of methanol was then added and the solution warmed to remove additional quantities of residual nitrogenous products and other volatile impurities (A). The residue was then diluted with 413 grams of water and 100 grams of sulfuric acid and boiled for one hour. Sufficient barium carbonate was added to give a pH of 4.5 and barium hydroxide added to raise the pH to 8. Insoluble barium salts were removed by filtration, the filtrate was concentrated to 40° Bé., and the soluble barium salts precipitated by the addition of three volumes of methanol. This mixture was then filtered (B), and the filter cake dissolved in water. The theoretical amount of sodium sulfate required to precipitate barium as barium sulfate was then added to the resultant solution and the mixture filtered to remove barium sulfate, yielding a clear solution of the sodium salts of the organic acids, particularly sodium glucuronate. This final solution was concentrated to a sirup containing approximately 50% by weight dry substance (C).

II. Esterification and purification 1050 grams of the above final solution of sodium salts (C), containing 165 grams apparent glucuronic acid, was mixed with 3900 grams of n-butyl alcohol and 222 grams of concentrated sulfuric acid. The mixture was esterified by refluxing for 6.7 hours, during which time 355 ml. of water was collected from the distillate in a water trap below the condenser. The reaction mixture was homogeneous except for a partly crystalline salt phase. It was neutralized to pH 4.5 with sodium carbonate and filtered.

The filtrate was first extracted with one two-liter portion of water and then with three one-liter portions of water. 5 liters of benzene and 250 ml. of water were then added to the alcoholic phase, and a new water phase separated and removed.

III. Isolation of glucuronolactone

Butyl alcohol and benzene were then removed from the enriched alcoholic solution by distillation, and the butyl esters were hydrolyzed by refluxing for four hours with 5 liters of 3% aqueous sulfuric acid. The hydrolyzate was concentrated under vacuum to 1400 ml. and then extracted twice with 350 ml. portions of butyl alcohol to remove further impurities. 55% of the original glucuronic acid equivalent was present in the aqueous phase, which was then concentrated to 200 ml. under reduced pressure. To this concentrated solution there was added 400 ml. of acetic acid and the mixture was again concentrated to 200 ml. and then allowed to stand 48 hours at 80° F. Upon filtration, 42.3 g. of glucuronolactone analyzing 105% glucuronic acid was obtained. Recrystallization gave a high yield of pure glucuronolactone.

EXAMPLE II 100 grams of sodium salts from a methyl glucoside oxidation mixture, prepared as in Example I, was mixed with 400 grams of butyl alcohol and 22 grams of sulfuric acid. 225 ml. of distillate including water was removed under a vacuum. An equal volume of fresh butyl alcohol was added to the mixture, which was then refluxed four hours on an oil bath. At the end of this period the solution was cooled and neutralized to pH 4.5 with 10 grams of sodium carbonate dissolved in 150 ml. of water. All inorganic solids were now in solution. The aqueous phase containing the inorganic solids was separated, and the alcoholic phase was extracted with three 100 ml. portions of water. The combined aqueous extracts amounted to 430 ml. (A). The alcoholic phase was then extracted with a mixture 500 ml. of benzene and 75 ml. of water. Two phases were obtained: the lower, 184 ml. (B); the upper, 905 ml. (C).

The alcoholic phase (C) was concentrated in vacuo to a viscous mass. Five hundred ml. of 3% aqueous sulfuric acid solution was added to the residue and the mixture refluxed for one hour, during which time 15 ml. of butyl alcohol were removed from the distillate. After cooling, 40 grams of barium carbonate was added to the solution to give a pH of 2.6. Filtration followed by adjustment to pH 2.1 with sulfuric acid and refiltration yielded 890 ml. of a light amber-colored solution (D).

Distribution of glucuronic acid in the various fractions from this experiment is shown in the table below:

| Fraction | Apparent Glucuronic Acid | | Dry Substance | |
|---|---|---|---|---|
| | g. | Percent of Original | g. | Percent as G. A. |
| (A) First aqueous extracts | 0.8 | 6.1 | | |
| (B) Second aqueous extracts | 0.9 | 6.1 | 10.0 | 9.0 |
| (C) Water-washed ester | 11.8 | 90.7 | 35.0 | 33.8 |
| (D) Purified hydrolyzate | 10.5 | 80.5 | 16.6 | 63.3 |
| Original solution | 13.1 | 100.0 | 50 | 26.2 |

EXAMPLE III 256 grams of unneutralized methyl glucoside oxidation mixture (stage A in Example I), containing 200 grams dry substance of which 70.2 grams was apparent glucuronic acid, was refluxed with 2450 ml. of n-butyl alcohol and 5.7 ml. concentrated sulfuric acid. Water was collected in a trap and amounted to less than one ml. per hour at the end of five hours. The esterification mixture was then cooled and neutralized with sodium carbonate solution. The alcohol layer was separated and extracted three times with 500 ml. of water followed by a fourth extraction after the addition of 1000 ml. of benzene. The alcoholic phase containing butyl ester of methyl glucuronoside contained at this point 68 percent of the original apparent glucuronic acid. The losses of apparent glucuronic acid up to this point have been shown not to be due to the extraction of actual glucuronic substance into the aqueous phases but to glucuronic-reacting substances produced in the initial oxidation, unstable under the conditions used for hydrolysis or esterification, and decomposed in Examples I and II by the alkaline neutralization.

The washed alcoholic solution was freed of solvents, hydrolyzed, freed of sulfuric acid, and concentrated as in Example II. After these operations it contained 39 grams of glucuronic acid in 65 grams of dry substance or a glucuronic acid concentration of 60% as compared to 35% of total analyzable glucuronic acid in the starting material.

The hydrolyzate was concentrated and crystallized according to the method described in Example I. The yield was 11.2 grams of product assaying 94% of glucuronic acid.

EXAMPLE IV

A sample of oxidation mixture obtained in the conversion of methyl glucoside to methyl glucuronoside as described in Example I and treated as in Example I to form the barium salts (stage B of Example I) was dried to give 400 grams of barium salts analyzing 140 grams apparent glucuronic acid. This material was slurried with 2 liters n-butyl alcohol and 60 ml. concentrated sulfuric acid. The mixture was heated under agitation to boiling (114° C.) and refluxed at this temperature for 1.5 hours to esterify the acids. Barium sulfate was then filtered off, and 1500 ml. of benzene was added to the butyl alcohol solution (1500 ml.), which was then washed with five 500-ml. portions of distilled water.

The washed, enriched alcoholic solution was concentrated to 500 ml., and one liter of water containing 30 ml. of concentrated sulfuric acid was added to the residue. The mixture was boiled for five hours to hydrolyze the esters, butyl alcohol being removed by azeotropic distillation and water being added to maintain a constant volume. The hydrolyzate thus obtained analyzed 58 grams glucuronic acid, and was extracted with butyl alcohol, neutralized with barium hydroxide, decolorized with carbon, and filtered. The purified hydrolyzate was then concentrated to 400 ml. at 60° C., diluted with 300 ml. glacial acetic acid, and reconcentrated to 300 ml. under vacuum. The last step was repeated and the final concentrate set aside to cool. 40 grams of crystalline product, analyzing 95% glucuronic acid, was obtained.

EXAMPLE V 400 grams of dry barium salts from a methyl glucoside oxidation mixture as in Example 4 was heated at 115-124° C. for 2.5 hours with 1 liter of mixed amyl alcohols, sold under the trade mark "Pentasol," in the presence of 120 percent of the amount of sulfuric acid required for precipitation of the barium contained in the salts.

The crude ester was diluted with 1 liter of aliphatic hydrocarbon solvent sold under the trademark "Skellysolve F," and successively extracted with four 250-ml. portions of water.

The washed ester fraction was freed of excess solvent and then hydrolyzed by refluxing for 1.5 hours in 3% aqueous sulfuric acid. The hydrolyzate was concentrated, decolorized with carbon, and extracted with mixed amyl alcohols. After concentration of the purified hydrolyzate with acetic acid as in preceding examples, three crops of crystals, analyzing 97 to 106 percent glucuronic acid, were obtained. The overall yield was 48 percent.

EXAMPLE VI

A 300-gram sample of sodium glucuronate syrup, containing 56.7 grams of glucuronic acid was mixed with 650 grams of n-hexyl alcohol and 41 grams of sulfuric acid. Water was removed by azeotropic distillation, and the mixture was heated at reflux (158° C.) for 2.5 hours. The resulting solution was neutralized with aqueous barium hydroxide solution, filtered, diluted with one liter of hydrocarbon solvent sold under the trade-mark "Skellysolve B," and washed with three one-liter portions of water. The washed alcoholic solution of the ester, was found to contain 74% of the glucuronic acid present originally.

We claim:

1. Process for isolating a substance from the group consisting of glucuronic acid, glucuronolactone and mixtures thereof from mixtures resulting from the selective oxidation of a water-soluble glucose derivative in which the aldehyde group is protected and the primary hydroxyl group is free, comprising esterifying said mixture in the presence of an acid esterification catalyst with an alcohol containing from two to seven carbon atoms in the molecule; extracting the esterified mixture with water in the presence of a water immiscible solvent to remove water-soluble impurities; hydrolyzing the purified esters; and recovering said substance from the group consisting of glucuronic acid, glucuronolactone and mixtures thereof from the hydrolyzate.

2. Process for isolating a substance from the group consisting of glucuronic acid, glucuronolactone and mixtures thereof from mixtures resulting from the selective oxidation of a water-soluble glucose derivative in which the aldehyde group is protected and in which the primary alcohol group is free, comprising esterifying said mixture in the presence of an acid esterification catalyst with an alcohol containing from two to seven carbon atoms in the molecule; contacting the esterification mixture with water and a hydrocarbon solvent to remove impurities; hydrolyzing the purified esters; and recovering a substance from the group consisting of glucuronic acid, glucuronolactone and mixtures thereof from the hydrolyzate.

3. Process for isolating a substance from the group consisting of glucuronic acid, glucuronolactone and mixtures thereof from mixtures resulting from the selective oxidation of a glucose derivative in which the aldehyde group is protected and the primary alcohol group is free, comprising esterifying said mixture in the presence of an acid esterification catalyst in an amount within the range of about 0.5 per cent to about 5.0 per cent, by weight, of said mixture with an alcohol containing from two to seven carbon atoms in the molecule; extracting water-soluble impurities from the esterified mixture dissolved in a water-immiscible solvent from the group consisting of alcohols, and mixtures of alcohols with hydrocarbons; separating the organic solvent phase containing glucuronic ester from the aqueous phase containing impurities; hydrolyzing the purified esters; and recovering said substance from the group consisting of glucuronic acid, glucuronolactone and mixtures thereof from the hydrolyzate.

4. Process for isolating a substance from the group consisting of glucuronic acid, glucuronolactone and mixtures thereof from mixtures resulting from the selective oxidation of a water-soluble glucose derivative in which the aldehyde group is protected and the primary alcohol group is free, comprising esterifying said mixture in the presence of an acid esterification catalyst with at least one alcohol from the group consisting of propyl, butyl, and amyl alcohols; contacting the esterified mixture with water and a hydrocarbon solvent to remove impurities therefrom; hydrolyzing the purified esters; and recovering said substance from the group consisting of glucuronic acid, glucuronolactone and mixtures thereof from the hydrolyzate.

5. Process for isolating a substance from the group consisting of glucuronic acid, glucuronolactone and mixtures thereof from mixtures resulting from the selective oxidation of a water-soluble glucose derivative in which the aldehyde group is protected and the primary alcohol group is free, comprising esterifying said mixture with at least one alcohol containing from two to seven carbon atoms in the molecule, in the presence of an esterification catalyst from the group consisting of sulfuric acid, hydrochloric acid, phosphoric acid benzenesulfonic acid, and mixtures thereof; adding a hydrocarbon solvent to an alcoholic solution of the esterified mixture; extracting the alcohol-hydrocarbon solution of said esterified mixtures with water to remove impurities; hydrolyzing said esterified mixture; and recovering said substance from the group consisting of glucuronic acid, glucuronolactone and mixtures thereof from the hydrolyzate.

6. Process for isolating a substance from the group consisting of glucuronic acid, glucuronolactone and mixtures thereof from mixtures resulting from the selective oxidation of a water-soluble glucose derivative in which the aldehyde group is protected and the primary alcohol group is free, comprising esterifying said mixture with at least one alcohol containing two to seven carbon atoms in the molecule, in the presence of an esterification catalyst from the group consisting of sulfuric acid, hydrochloric acid, phosphoric acid, benzenesulfonic acid, and mixtures thereof; extracting the esterified mixture with water; adding a sufficient quantity of a hydrocarbon solvent to said esterified mixture to cause tars and color bodies to separate therefrom; hydrolyzing said esterified mixture; and recovering said substance from the group consisting of glucuronic acid, glucuronolactone and mixtures thereof from the hydrolyzate.

7. Process for isolating a substance from the group consisting of glucuronic acid, glucuronolactone and mixtures thereof from mixtures resulting from the selective oxidation of the primary alcohol group of a water-soluble glucoside, comprising esterifying said mixture by heating the same in the presence of at least one alcohol containing from two to seven carbon atoms in the molecule, in the presence of an esterification catalyst from the group consisting of sulfuric acid, hydrochloric acid, phosphoric acid, benzenesulfonic acids and mixtures thereof; said catalyst being present in an amount within the range from about 0.5% to about 5.0% by weight of said mixture; extracting water-soluble impurities from the esterified mixture with water in the presence of a water immiscible solvent; hydrolyzing the purified esters, and recovering said substance from the group consisting of glucuronic acid, glucuronolactone and mixtures thereof from the hydrolyzate.

8. Process according to claim 7, wherein a hydrocarbon solvent is added to the esterified mixture during said extraction of water-soluble impurities.

9. Process according to claim 7, wherein said alcohol is n-butyl alcohol.

10. Process according to claim 7, wherein said alcohol is amyl alcohol.

11. Process according to claim 7, wherein said alcohol is n-hexyl alcohol.

12. Process for the isolation of glucuronolactone from mixtures resulting from the oxidation of methyl glucoside to methyl glucuronoside, comprising esterifying said mixture with n-butyl alcohol in the presence of sulfuric acid in an amount from about 0.5% to about 5.0% by weight of said mixture; extracting water-soluble impurities from the esterified mixture; hydrolyzing the purified esters in dilute aqueous sulfuric acid solution; concentrating the hydrolyzate; extracting said hydrolyzate with a water-immiscible alcohol to remove impurities therefrom; diluting said hydrolyzate with glacial acetic acid; and crystallizing glucuronolactone therefrom.

13. Process for the isolation of glucuronolactone from mixtures resulting from the oxidation of methyl glucoside to methyl glucuronoside, comprising esterifying said mixture with n-butyl alcohol in the presence of sulfuric acid in an amount within the range from about 0.5% to about 5.0% by weight of said mixture and continuously removing water from said mixture during esterification by azeotropic distillation, said esterification being allowed to continue until the distillate ceases to contain further quantities of water; extracting the alcoholic solution of ester with water; adding benzene to said alcoholic solution and again extracting the same with water; removing organic solvents from the purified esters; hydrolyzing said esters; and crystallizing glucuronolactone from the hydrolyzate.

14. Process for isolating glucuronolactone from mixtures resulting from the oxidation of methyl glucoside to methyl glucuronoside, comprising esterifying said mixture with n-butyl alcohol in the presence of sulfuric acid in an amount within the range from about 0.5% to about 5.0% by weight of said mixture; adding benzene to the alcoholic solution of the esterified mixture and extracting the same with water to remove impurities; removing alcohol and benzene from the purified ester phase; hydrolyzing said esters in dilute sulfuric acid; extracting the hydrolyzate with n-butyl alcohol; removing sulfate ion from said hydrolyzate; decolorizing said hydrolyzate; and recovering crystalline glucuronolactone therefrom by crystallization from acetic acid solution.

15. Process for isolating a substance from the group consisting of glucuronic acid, glucuronolactone and mixtures thereof from mixtures containing at least 20% of a glucuronic acid compound resulting from the selective oxidation of the primary alcohol group of a water-soluble glucoside, comprising esterifying said mixture with at least one alcohol containing two to seven carbon atoms in the molecule, in the presence of an acid esterification catalyst; extracting water-soluble non-uronic acid substances from the esterified mixture with water in the presence of a water immiscible solvent; hydrolyzing the purified esters; and recovering said substance from the group consisting of glucuronic acid, glucuronolactone and mixtures thereof from the hydrolyzate.

16. Process for isolating a substance from the group consisting of glucuronic acid, glucuronolactone and mixtures thereof from mixtures containing from about 20% to about 40% of an alkyl glucuronoside and obtained by oxidation of a water-soluble glucoside, comprising esterifying said mixture with at least one alcohol containing two to seven carbon atoms in the molecule, in the presence of an acid esterification catalyst; extracting water-soluble non-uronic acid substances from the esterified mixture with water in the presence of a water immiscible solvent; hydrolyzing the purified esters; and recovering said substance from the group consisting of glucuronic acid, glucuronolactone and mixtures thereof from the hydrolyzate.

17. Process for isolating glucuronolactone from mixtures resulting from the oxidation of methyl glucoside to methyl glucuronoside, comprising converting said methyl glucuronoside present in said mixture to sodium glucuronate, esterifying said mixture with n-butyl alcohol in the presence of sulfuric acid in an amount within the range from about 0.5% to about 5.0% by weight of said mixture; adding benzene to the alcoholic solution of the esterified mixture and extracting the same with water to remove impurities; removing alcohol and benzene from the purified ester phase; hydrolyzing said esters in dilute sulfuric acid; extracting the hydrolyzate with n-butyl alcohol; removing sulfate ion from said hydrolyzate; decolorizing said hydrolyzate; and recovering crystalline glucuronolactone therefrom by crystallization from acetic acid solution.

References Cited in the file of this patent

UNITED STATES PATENTS

| Number | Name | Date |
| --- | --- | --- |
| 1,830,618 | Pasternack et al. | Nov. 3, 1931 |
| 2,334,524 | Wenker | Nov. 16, 1943 |
| 2,350,370 | Schopmeyer | June 6, 1944 |
| 2,420,234 | Filachione | May 6, 1947 |
| 2,520,255 | Peterman | Aug. 29, 1950 |
| 2,520,256 | Peterman | Aug. 29, 1950 |
| 2,592,249 | Couch et al. | Apr. 8, 1952 |